United States Patent
Hu (10) Patent No.: US 8,780,882 B2
(45) Date of Patent: Jul. 15, 2014

(54) ON-DEMAND SPECTRUM CONTENTION FOR INTER-CELL SPECTRUM SHARING IN COGNITIVE RADIO NETWORKS

(75) Inventor: Wendong Hu, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 447 days.

(21) Appl. No.: 12/354,606

(22) Filed: Jan. 15, 2009

(65) Prior Publication Data

US 2009/0180492 A1 Jul. 16, 2009

Related U.S. Application Data (60) Provisional application No. 61/021,568, filed on Jan. 16, 2008.

(51) Int. Cl.
*H04W 74/08* (2009.01)
(52) U.S. Cl.
CPC .................................... *H04W 74/08* (2013.01)
USPC .......................................... 370/348; 370/230
(58) Field of Classification Search
CPC ............ H04W 74/08; H04W 74/0833; H04W 74/085; H04W 74/04; H04L 5/003
USPC ......... 370/431–432, 444, 461–462, 229–230, 370/524, 328–329, 347
See application file for complete search history.

(56) References Cited

U.S. PATENT DOCUMENTS

| | | | |
|---|---|---|---|
| 5,191,578 A | 3/1993 | Lee | |
| 5,394,433 A | 2/1995 | Bantz et al. | |
| 5,574,979 A | 11/1996 | West | |
| 5,627,880 A | 5/1997 | Rozanski et al. | |
| 5,862,142 A | 1/1999 | Takiyasu et al. | |
| 6,788,702 B1 * | 9/2004 | Garcia-Luna-Aceves et al. | 370/458 |
| 6,882,851 B2 | 4/2005 | Sugar et al. | |
| 7,146,172 B2 | 12/2006 | Li et al. | |
| 7,197,025 B2 | 3/2007 | Chuah | |
| 7,289,542 B2 | 10/2007 | Schmandt | |

(Continued)

FOREIGN PATENT DOCUMENTS

| | | | |
|---|---|---|---|
| EP | 1850543 A2 * | 10/2007 | |
| GB | 2165726 A * | 4/1986 | |

OTHER PUBLICATIONS

IEEE P802.22 Wireless RANs (Nov. 2005) authored by Hu, Wendong and Sofer, Eli.*

(Continued)

*Primary Examiner* — Huy D Vu
*Assistant Examiner* — Benjamin Lamont
(74) *Attorney, Agent, or Firm* — Hogan Lovells US LLP (57) ABSTRACT

A protocol for resolving shared spectrum contentions in cognitive radio wireless access networks is presented. Using medium access control level messaging a request for access to a shared spectrum is conveyed to the current occupier of the spectrum. Each request is associated with a unique and random spectrum access priority number. At the end of a request window the priority numbers associated with each request are compared and a winner is declared. The winning cell, informed of its newly gained access to the shared spectrum, sends a reply to the current occupier of the shared spectrum with a proposed time of acquisition/release of the shared spectrum. The proposed time is confirmed and announced, and upon arrival of the designated time the shared spectrum is released by the current occupier of the shared spectrum and acquired by the requesting cell.

9 Claims, 7 Drawing Sheets

(56) References Cited

U.S. PATENT DOCUMENTS

| | | |
|---|---|---|
| 7,423,966 B2 | 9/2008 | Xu |
| 7,496,081 B2 | 2/2009 | Salokannel et al. |
| 7,505,761 B2 | 3/2009 | Ikeda |
| 7,715,343 B2 | 5/2010 | Tomioka |
| 7,742,764 B2 | 6/2010 | Gillig et al. |
| 7,756,058 B2 | 7/2010 | Cordeiro et al. |
| 7,801,077 B2 | 9/2010 | Rentel et al. |
| 7,801,526 B2 | 9/2010 | Newberg et al. |
| 7,826,422 B2 | 11/2010 | Chu et al. |
| 7,860,500 B2 | 12/2010 | Buchwald et al. |
| 7,937,045 B2 | 5/2011 | Lekeslius |
| 2002/0054679 A1* | 5/2002 | Vesely ............... 380/46 |
| 2002/0176364 A1 | 11/2002 | Nakamura et al. |
| 2003/0156553 A1 | 8/2003 | Benveniste |
| 2003/0224787 A1 | 12/2003 | Gandolfo |
| 2004/0028003 A1 | 2/2004 | Diener et al. |
| 2004/0090979 A1 | 5/2004 | Xu |
| 2004/0166838 A1 | 8/2004 | Backes et al. |
| 2006/0225089 A1 | 10/2006 | Ikeda |
| 2006/0239220 A1 | 10/2006 | Celentano et al. |
| 2006/0245448 A1 | 11/2006 | Chan et al. |
| 2007/0091998 A1 | 4/2007 | Woo et al. |
| 2007/0165586 A1 | 7/2007 | Taylor et al. |
| 2007/0258404 A1 | 11/2007 | Tirkkonen et al. |
| 2007/0274206 A1 | 11/2007 | Habetha et al. |
| 2008/0009305 A1 | 1/2008 | Li et al. |
| 2008/0014861 A1 | 1/2008 | Li et al. |
| 2008/0101264 A1 | 5/2008 | Li et al. |
| 2008/0101308 A1* | 5/2008 | Gaur ............... 370/338 |
| 2008/0101447 A1 | 5/2008 | Li et al. |
| 2008/0144493 A1* | 6/2008 | Yeh ............... 370/230 |
| 2008/0159258 A1 | 7/2008 | Ji et al. |
| 2008/0219286 A1* | 9/2008 | Ji et al. ............... 370/445 |
| 2008/0267148 A1 | 10/2008 | Speight |
| 2008/0309490 A1 | 12/2008 | Honkanen et al. |
| 2008/0317062 A1 | 12/2008 | Timmers et al. |
| 2009/0067354 A1 | 3/2009 | Gao et al. |
| 2009/0096660 A1 | 4/2009 | Lekselius |
| 2009/0180453 A1 | 7/2009 | Hu |
| 2009/0180492 A1 | 7/2009 | Hu |
| 2009/0258603 A1 | 10/2009 | Ghaboosi et al. |
| 2009/0274140 A1 | 11/2009 | Cordeiro et al. |
| 2009/0274195 A1 | 11/2009 | Chang |
| 2009/0323697 A1 | 12/2009 | Celentano et al. |
| 2010/0009692 A1 | 1/2010 | Shan et al. |
| 2010/0020732 A1 | 1/2010 | Gaddam et al. |
| 2010/0034143 A1 | 2/2010 | Cordeiro et al. |
| 2010/0091711 A1 | 4/2010 | Sawai |
| 2010/0232310 A1 | 9/2010 | Hu |
| 2010/0232358 A1 | 9/2010 | Hu |
| 2010/0232359 A1 | 9/2010 | Hu |
| 2010/0232360 A1 | 9/2010 | Hu |
| 2010/0232361 A1 | 9/2010 | Hu |
| 2010/0232381 A1 | 9/2010 | Hu |
| 2010/0246434 A1 | 9/2010 | Wang et al. |
| 2010/0260085 A1 | 10/2010 | Wang et al. |
| 2010/0271948 A1 | 10/2010 | Challapali et al. |
| 2010/0296404 A1 | 11/2010 | Quadri et al. |
| 2010/0304772 A1 | 12/2010 | Wang et al. |
| 2011/0032912 A1 | 2/2011 | Cordeiro et al. |
| 2011/0090887 A1 | 4/2011 | Kim et al. |

OTHER PUBLICATIONS

Hu, Wendong et al., Efficient, Flexible, and Scalable Inter-Network Spectrum Sharing and Communications in Cognitive IEEE 802.22 Networks, STMicroelectronics Inc. and University of California, Los Angeles, No. Date, pp. 5.

Hu, Wendong, Beaconing Period Framing for Efficient Multi-Channel Inter-Cel Communications in Cognitive Radio Networks, Jan. 7, 2008, pp. 9.

* cited by examiner

ON-DEMAND SPECTRUM CONTENTION FOR INTER-CELL SPECTRUM SHARING IN COGNITIVE RADIO NETWORKS

RELATED APPLICATION

The present application relates to and claims the benefit of priority to U.S. Provisional Patent Application No. 61/021, 568 filed Jan. 16, 2008, which is hereby incorporated by reference in its entirety for all purposes as if fully set forth herein. The present application further relates to U.S. patent application No. 12/354,593 filed Jan. 15, 2009 and entitled, "Beaconing Period Framing for Efficient Multi-channel Inter-cell Communications in Cognitive Radio Networks" and U.S. patent application No. 11/549,890 filed Oct. 16, 2006 entitled, "Method of Inter-System Co-Existence and Spectrum Sharing for Dynamic Spectrum Access Networks-On-Demand Spectrum Contention," which are both hereby incorporated by reference in their entirety for all purposes as if fully set forth herein.

BACKGROUND OF THE INVENTION

1. Field of the Invention

Embodiments of the present invention relate, in general, to inter-cell spectrum sharing in cognitive radio networks and particularly to an on-demand spectrum contention protocol employing interactive messaging.

2. Relevant Background

Cognitive Radio is an enabling technology that allows unlicensed radio transmitters to operate in the licensed bands at locations when that spectrum is temporally not in use. Based on cognitive radio technology, Institute of Electrical and Electronics Engineers ("IEEE") 802.22, following a Federal Communication Commission ("FCC") Notice of Proposed Rulemaking in 2004, is an emerging standard for Wireless Regional Area Networks ("WRAN") aiming to provide alternative broadband wireless access in, among other places, rural areas. Cognitive radio operates on a license-exempt and non-interference basis in the Television ("TV") band (between 47-910 MHz) without creating harmful interference to the licensed services, which include, among others, Digital TV ("DTV") and Part 74 devices (e.g. wireless microphones).

Figure 1:
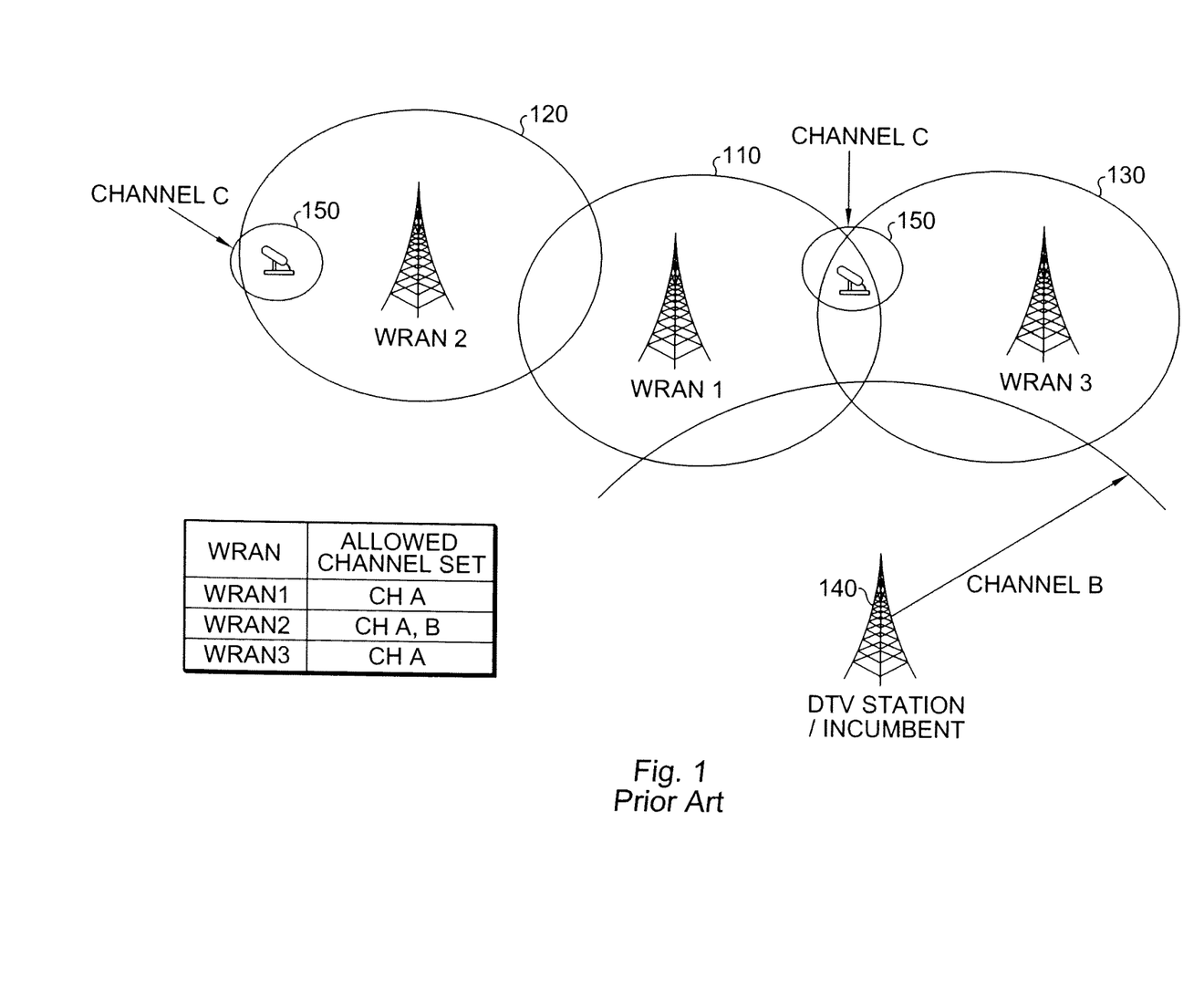
FIG. 1 shows a cognitive radio wireless network of three overlapping cells and an incumbent digital television station as known in the prior art.

In a typical deployment scenario, multiple WRAN cells, each of which comprises a base station ("BS") and associated customer premise equipments ("CPE"), may operate in the same vicinity while coexisting with DTV and Part 74 devices. In order to effectively avoid harmful interference to these licensed incumbents, the set of channels on which the WRAN cells are allowed to operate could be quite limited. For example as shown in FIG. 1, residing within the protection contours of DTV 140 and wireless microphones 150, both WRAN1 110 and WRAN3 130 are only allowed to operate on channel A, while WRAN2 120 may occupy either channel A or B, assuming that in total only 3 channels (channel A, B and C) are available. If WRAN1 and WRAN3 (or WRAN1 and WRAN2) attempt to perform data transmissions on channel A simultaneously, mutual interference between these collocated WRAN cells could degrade the system performance significantly.

Two approaches to resolve such contentions are known in the prior art as Aloha and Carrier Sense Multiple Access ("CSMA"). Both Aloha and CSMA resolve spectrum contention by deferring packet transmission with random periods. In CSMA a transmitting data station detects another signal while transmitting a frame, stops transmitting that frame, transmits a jam signal, and then waits for a random time interval before trying to send that frame again.

In the Aloha system, nodes that need to transmit simply send out their frames as soon as they are ready. Normally this means that the first node to start using the radio has exclusive transmission rights for an indeterminate time period, meaning other nodes cannot transmit any words until the first node finishes. In order to avoid this problem, the ALOHAnet required that the nodes break down their messages into small packets and send them one at a time with gaps between them. This allows other nodes to send out their packets in between, meaning the nodes can share the medium at the same time. However, if two nodes attempt to start their broadcast at the same time, a collision could occur. In the Aloha system after sending any packet, a node listens to see whether its own message was sent back to it by a central hub. When the node receives its message back, it can move on to its next packet.

But when a node does not receive its packet back, meaning that something prevented the packet from arriving at the hub—like a collision with another node's packet, the node simply waits for a random period of time and then attempts transmission again. Since each node chooses a random time to wait, one of the nodes is the first to re-try, and the other nodes then see that the channel is in use when they attempt transmission, resulting in yet another random wait period for those nodes. Under most circumstances this technique would significantly decrease or even eliminate collisions, but when the network gets busy the number of collisions can rise dramatically to the point where every packet will collide, breaking down this approach.

Although avoiding harmful interference to licensed incumbents is of prime concern, another key design challenge to cognitive radio based WRAN systems, with the scenario illustrated above in mind, is how to dynamically share the scarce spectrum among the collocated WRAN cells so that performance degradation, due to mutual co-channel interference, is effectively mitigated. Moreover, it is important that an inter-network spectrum sharing scheme be used to maintain efficient spectrum usage, accommodate a large scale of networks with various coexistence scenarios, and provide fairness in spectrum access among the coexisting WRAN cells. These and other challenges are addressed by one or more embodiments of the present invention.

BRIEF SUMMARY OF THE INVENTION

An On-Demand Spectrum Contention ("ODSC") protocol uses an interactive message exchange conducted on the independent management channel to resolve contentions. According to one embodiment of the ODSC protocol, on an on-demand basis, base stations of the coexisting WRAN cells (also referred to herein as Wireless Access Network ("WAN") cells) contend for the shared spectrum by exchanging and comparing randomly generated spectrum access priority numbers via Medium Access Control ("MAC") layer messaging on an independently accessible inter-network communication channel. Recall that the MAC layer provides a variety of functions that support the operation of wireless LANs. In general, the MAC Layer manages and maintains communications between and among base stations and CPEs by coordinating access to a shared radio channel and utilizing protocols that enhance communications over a wireless medium. In the present implementation of ODSC, contention decisions are made by the coexisting network cells in a distributed way. Only the winner cell, which possesses a higher spectrum access priority compared to those of the other contending cells (the losers), can occupy the shared spectrum.

Thus the present invention does not cause any random delay on packet transmission and effectively avoids packet collisions and the 'hidden-node" problem (two cells are out of range of each other but within range of a central cell).

ODSC is thus a coexistence protocol that employs interactive MAC messaging on the inter-network communication channel to provide efficient, scalable, and fair inter-network spectrum sharing among the coexisting WAN cells. According to one embodiment of the present invention, coexisting WAN cells compete for the shared spectrum by exchanging and comparing randomly generated contention access priority numbers carried in the MAC messages. Such a spectrum contention process is iteratively driven by spectrum contention demands (i.e. intra-cell demands for additional spectrum resources to support data services, and inter-cell demands requesting for spectrum acquisitions). The contention decisions are made by the coexisting network cells in a distributed way that allows an arbitrary number of cells to contend for the shared spectrum in their proximities without relying on a central arbiter. Instead of behaving selfishly, the competing cells cooperate with one another to achieve the goals of fair spectrum sharing and efficient spectrum utilization.

According to one embodiment of the present invention, cognitive radio WAN cells contending for use of a shared spectrum resolve their contentions via MAC layer messaging. Once a WAN cell determines and selects a channel that is void of any incumbent signals, the WAN cell verifies that the channel can be shared with other WAN cells using a Transfer Power Control ("TPC") technique. If feasible the WAN cells schedules transmissions on the selected channel using appropriate TPC settings. However when such simultaneous use of the channel is infeasible, the WAN cell initiates ODSC protocols according to the present invention.

The ODSC protocol, according to one embodiment of the present invention, uses MAC level messaging to pass and receive information regarding spectrum sharing. Initially an announcement is made by a cell within the WAN that it currently occupies the shared spectrum of interest. This message is conveyed to all WAN cells that are within a one-hop interference range of the transmitting cell. Shortly after the announcement and during what is known as a request window, the occupying WAN cell receives from at least one other WAN cell a request for use of the shared spectrum. During the request window the occupying WAN cell may receive multiple requests for access to the same shared spectrum.

Associated with each request is a spectrum access priority number. Each spectrum access priority number is randomly generated. Upon expiration of the request window, the WAN cell currently occupying the shared spectrum also generates and is associated with a spectrum priority number. The spectrum access priority numbers associated with the received requests and that of the WAN cell currently occupying the shared spectrum are thereafter compared. The WAN cell associated with the highest spectrum access priority number is selected as the winner and thus subsequent occupier of the shared spectrum.

After selection of a winner the current occupier of the shared spectrum sends a response notifying the winning WAN cell of success in its attempt to acquire use of the shared spectrum as well as notifying the remaining contending WAN cells of failure. The winning WAN acknowledges the win and proposes a time at which the shared spectrum will be released. If agreeable, the current occupier of the shared spectrum confirm the time at which the winner will acquire the shared spectrum. Thereafter, at the acquisition time, the current occupier releases control of the shared spectrum to the winning WAN cell.

The effectiveness of the ODSC protocol stems from the availability of an efficient and reliable inter-network communication channel for the interactive MAC message exchanges among network cells. In addition to supporting cooperative spectrum sharing protocols such as ODSC, a reliable inter-network communication channel is also indispensable to other inter-network coordinated functions for 802.22 WRAN and, in general, other types of cognitive radio based networks (e.g. inter-network synchronization of quiet periods for spectrum sensing and coordinated frequency hopping).

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE SEVERAL VIEWS OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

A protocol for resolving shared spectrum contentions among WRAN cells in a cognitive radio network is hereafter disclosed in detail by way of example. The present invention resolves contention on a real-time basis between two or more WAN cells vying for use of the same spectrum by interacting on the medium access control layer in an efficient, scalable and fair manner. Co-existing WRAN cells contend for a shared spectrum by exchanging and comparing randomly generated spectrum access priority numbers via MAC layer messaging on an interdependently accessible inter-network communication channel. The decisions are made in a distributed manner allowing only the cell with the highest priority number to occupy a shared spectrum.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

Figure 2:
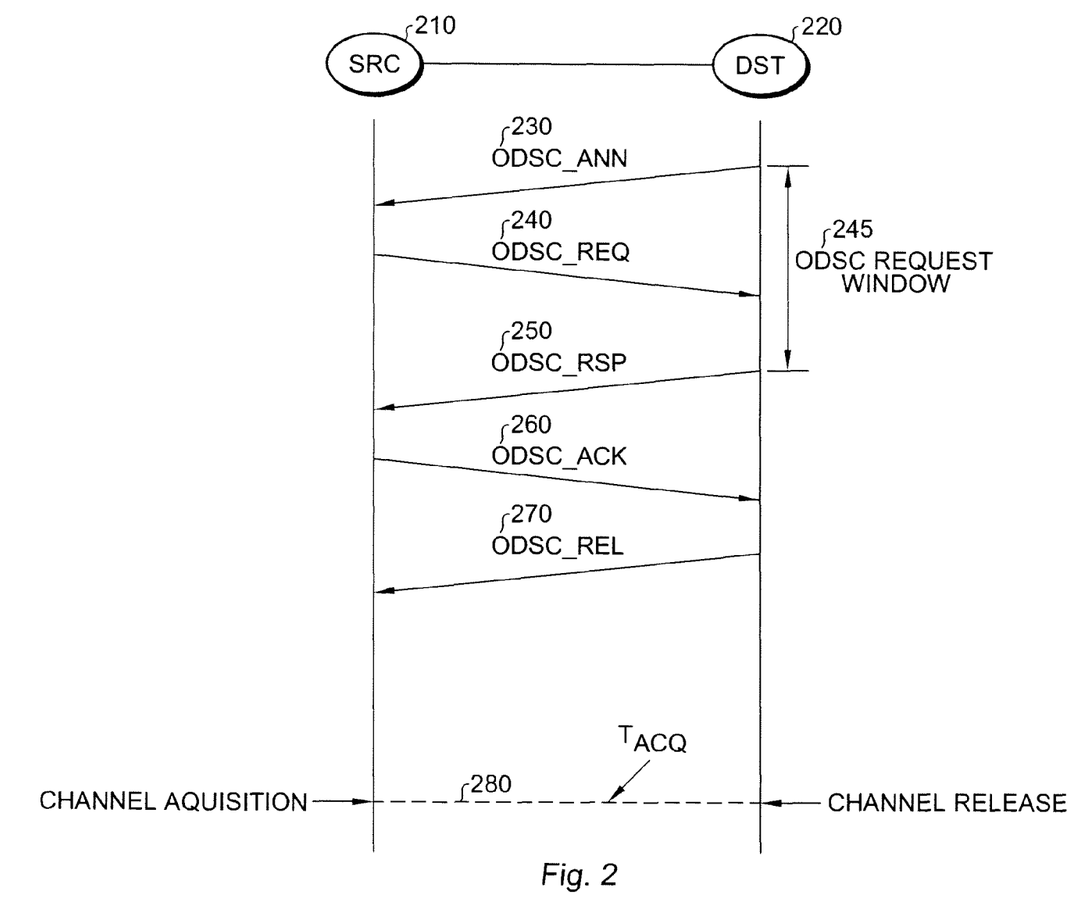
FIG. 2 shows one embodiment of an ODSC message flow between a source WAN cell and a destination WAN cell according to the present invention.

FIG. 2 depicts the basic MAC messaging flow of the ODSC protocol between two cognitive radio WAN cells that are within interference range of each other. A link between two cells as shown in FIG. 1 indicates a "one-hop" relationship between these cells (i.e. the "one-hop" neighbors). The present invention assumes that the MAC messages are delivered by robustly designed coexistence beacons as known to one skilled in the relative art such that the MAC messages can be received by all coexisting cells within one-hop.

During a network discovery stage, a spectrum-demanding cognitive radio WAN cell, referred to as ODSC source (SRC) 210 captures the ODSC announcement message (ODSC_ANN) 230 regularly broadcasted by a spectrum occupier cognitive radio WAN cell, referred to as ODSC destination (DST) 220. Driven by the spectrum demand for supporting its data services, the source 210 sends an ODSC request message (ODSC_REQ) 240 that includes a spectrum access priority number to the discovered destination 220. According to one embodiment of the present invention, the spectrum access priority number is a floating point number uniformly selected between 0 and 0.999999. In another embodiment the spectrum access priority number is selected from $[0, 2^{32}-1]$. The destination 220 maintains an ODSC request window 245 so as to allow multiple source WANs that submit ODSC_REQ messages at different time instances to have fair chances to participate in the contention process. Note that the spectrum access priority number is newly generated upon the issuance of each request during each request window.

At the end of the request window 245 the destination WAN, the WAN cell currently occupying the shared spectrum, generates its own spectrum access priority number. Thereafter the spectrum access priority number associated with the requesting source WAN 210 and the destination WAN 220 are compared. The WAN cell possessing the highest spectrum access priority number wins the contention and is designated as the next occupier of the shared spectrum.

The release and acquisition of the shared spectrum must, however, be orderly. Therefore after a winner has been designated the destination WAN 220 sends out an ODSC response (ODSC_RSP) 250 informing the source 210 that it has won the contention and soon will be gaining access to the shared spectrum. The source WAN 210 acknowledges the win with an ODSC_ACK message 260. Included in the acknowledgment message is a proposed spectrum acquisition time ($T_{acq}$). If the proposed acquisition time is acceptable, the destination WAN 220 replies with a release message (ODSC_REL) setting the stage for the release and acquisition of the shared spectrum. Then, when the acquisition time 280 arrives, the destination WAN 220 releases the shared spectrum which is acquired by the source WAN 210.

Figure 3:
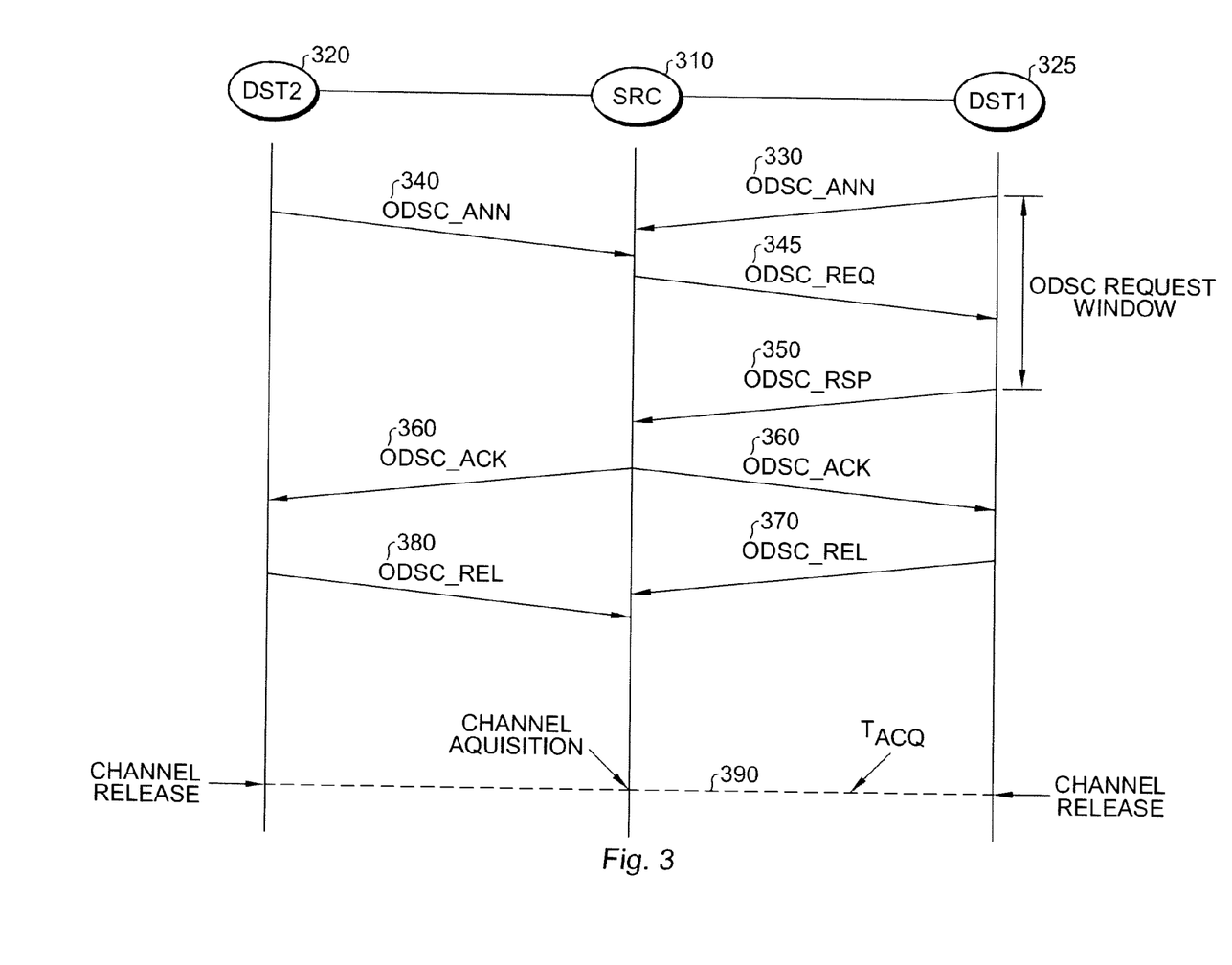
FIG. 3 illustrates one embodiment of ODSC message flow between one source WAN cell and two two-hop destination WAN cells competing for the same shared spectrum according to the present invention.

FIG. 3 shows a coexistence scenario where a SRC 310 is within one-hop distance from multiple destinations (DST1 325 and DST2 320) which are occupying the same channel according to one embodiment of the present invention. To contend for the channel, the source 310 randomly selects one of the destinations 325 (e.g. DST1) with which the source 310 will initiate the ODSC process as described above. As before the source 310 sends an ODSC request 345 to the desired destination 325 indicating its desire to occupy the shared spectrum. The spectrum access priority number of the source 310 and the destination 325 are compared and a winner determined. When the shared channel spectrum is granted to the source 310 after winning the contention, a response is sent 350 and thereafter the source 310 broadcasts an ODSC_ACK message to all destinations 320, 325 within one hop of the source 310.

As before the destination relinquishing the shared spectrum coordinates a release 370 of the shared spectrum. Besides the selected destination 325, the other destinations 320 within one hop of the source 310 that were not selected for the contention (e.g. DST2 320) also schedule channel release 380 at $T_{acq}$ 390 as indicated in the ODSC_ACK 360 after determining that a 2-hop neighbor destination 325 (DST1) is to release the channel to a one-hop neighbor source 310. Lastly, at $T_{acq}$ 390 the channel is released from the destination 325 and acquired by the source 310.

When there exist multiple destinations and sources in a coexistence scenario, it is likely that different sources could select a common destination and contend for the same spectrum resource as destination selection is fully random. Since the contention resolution processes at different destinations or sources are independent, there can exist multiple contention decisions being simultaneously circulated through control messages among the coexisting cells.

Figure 4:
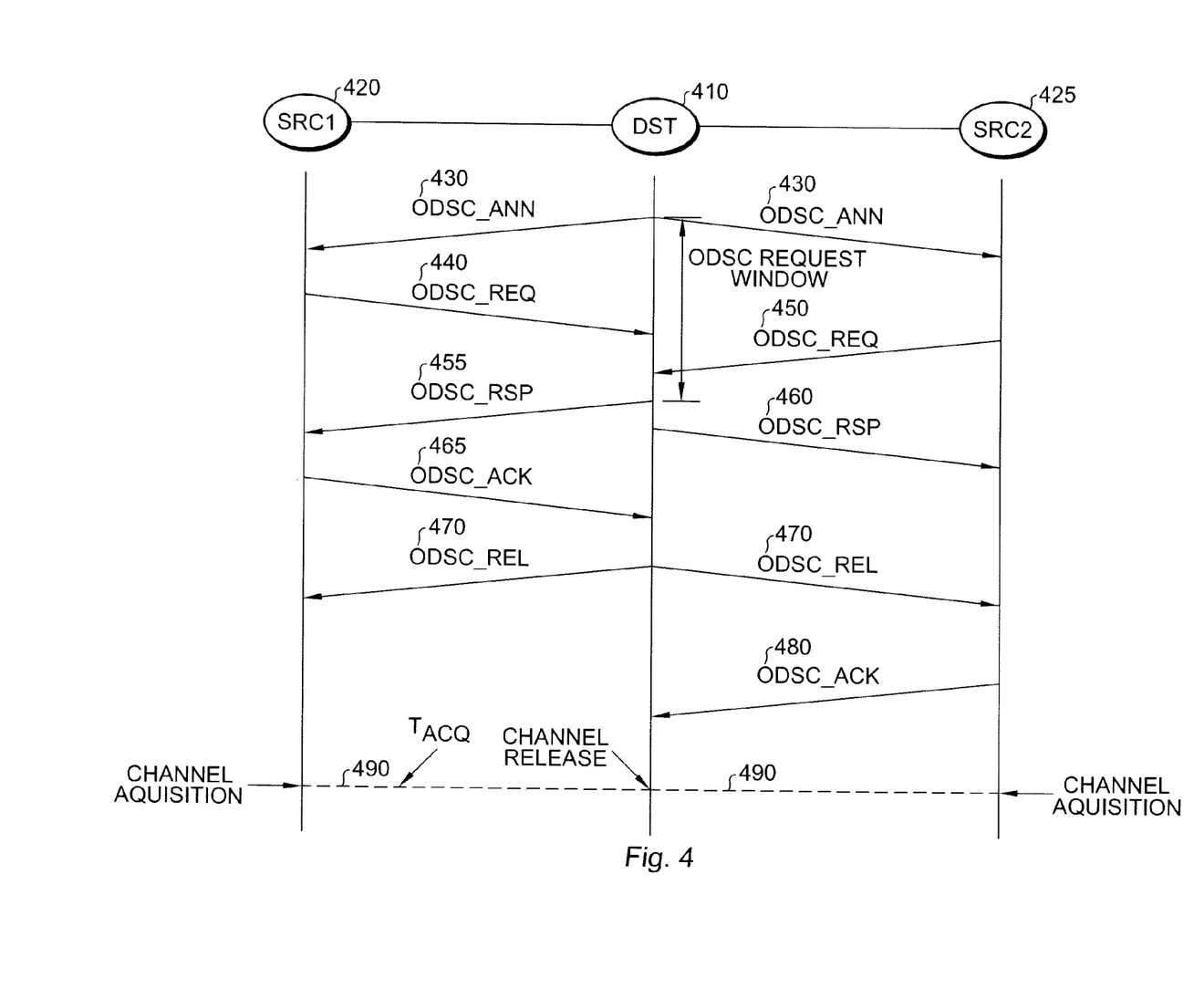
FIG. 4 shows one embodiment of ODSC message flow between one destination and two source WAN cells according to the present invention.

FIG. 4 illustrates the scenario according to one embodiment of the present invention in which multiple sources (SRC1 420 and SRC2 425) are contending for a channel associated with a single destination 410. As before the destination 410 broadcasts an announcement (ODSC_ANN 430) that it currently occupies a particular shared spectrum and is open for requests. Separate requests 440, 450 from sources 420, 425 within one hop of the destination 410 are thereafter received, each being associated with its own spectrum access priority number. At the end of an ODSC request window, the destination 410 randomly generates its own spectrum access priority number and compares it with the spectrum access priority numbers carried in the ODSC_REQ messages 440, 450 received from different sources 420, 425 (respectively) within the request window. If during the comparison of priority numbers the destination 410 is determined the winner (i.e. possesses higher priority), the destination 410 sends each source 420, 425 an ODSC_RSP message 455, 460 indicating a contention failure. Otherwise, the source with the highest spectrum access priority number will receive an ODSC_RSP message 455, 460 with an indication of contention success.

In this illustrated example, SRC1 420 possesses the highest spectrum access priority number and is the winner of the contention. Upon receipt of a success notice (ODSC_RSP 455), the wining source 420 schedules the channel acquisition at and broadcasts an ODSC acknowledgement message (ODSC_ACK) 465 that indicates the channel acquisition time ($T_{acq}$) and confirms the action of channel acquisition. After the ODSC_ACK 465 is received from the wining source 420, the current occupier of the shared spectrum, the destination 410, schedules a channel release operation to occur at $T_{acq}$ 490 (which is obtained from the ODSC_ACK) and broadcasts an ODSC_REL message 470. The channel release message 470 contains the information about the channel to be released, the release time (set to be the same as $T_{acq}$), and the ID of the winner source that will acquire the channel to the neighborhood. In order to enhance the channel use efficiency, the other sources (including those that lost the contention with the destination) that capture the ODSC_REL message 470 will also schedule channel acquisition at $T_{acq}$ 490 as long as it is determined from the ODSC_REL that a 1-hop destination is releasing the channel to a 2-hop neighbor. These other sources acknowledge this release with an ODSC_ACK message 480 prior to $T_{acq}$.

As briefly mentioned above, a typical coexistence scenario may consist of multiple spectrum occupiers (ODSC destinations) and requesters (ODSC sources) that could be either one-hop or multi-hop apart. Proper ODSC message exchanges are required among the coexisting cells to avoid the "hidden node" problem and enhance spectrum reuse efficiency. The following examples further describe the ODSC message flows for a number of basic scenarios in which multi-hop coexisting cells exist. The message flow for a more sophisticated scenario can be readily derived from these basic scenarios.

Figure 5:
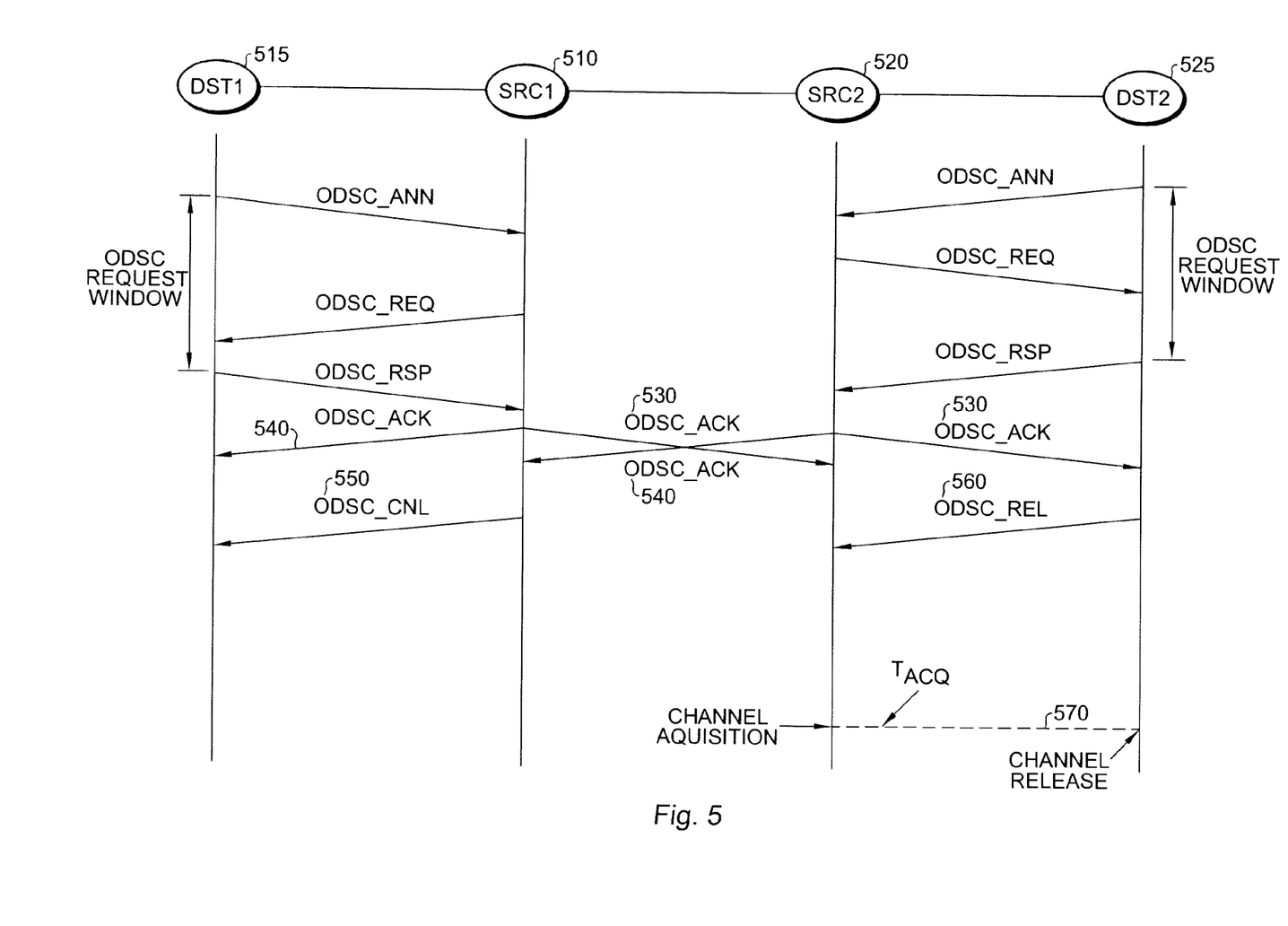
FIGS. 5 and 6 show ODSC message flow between multiple source and multiple destination WANs according to the present invention.
Figure 6:
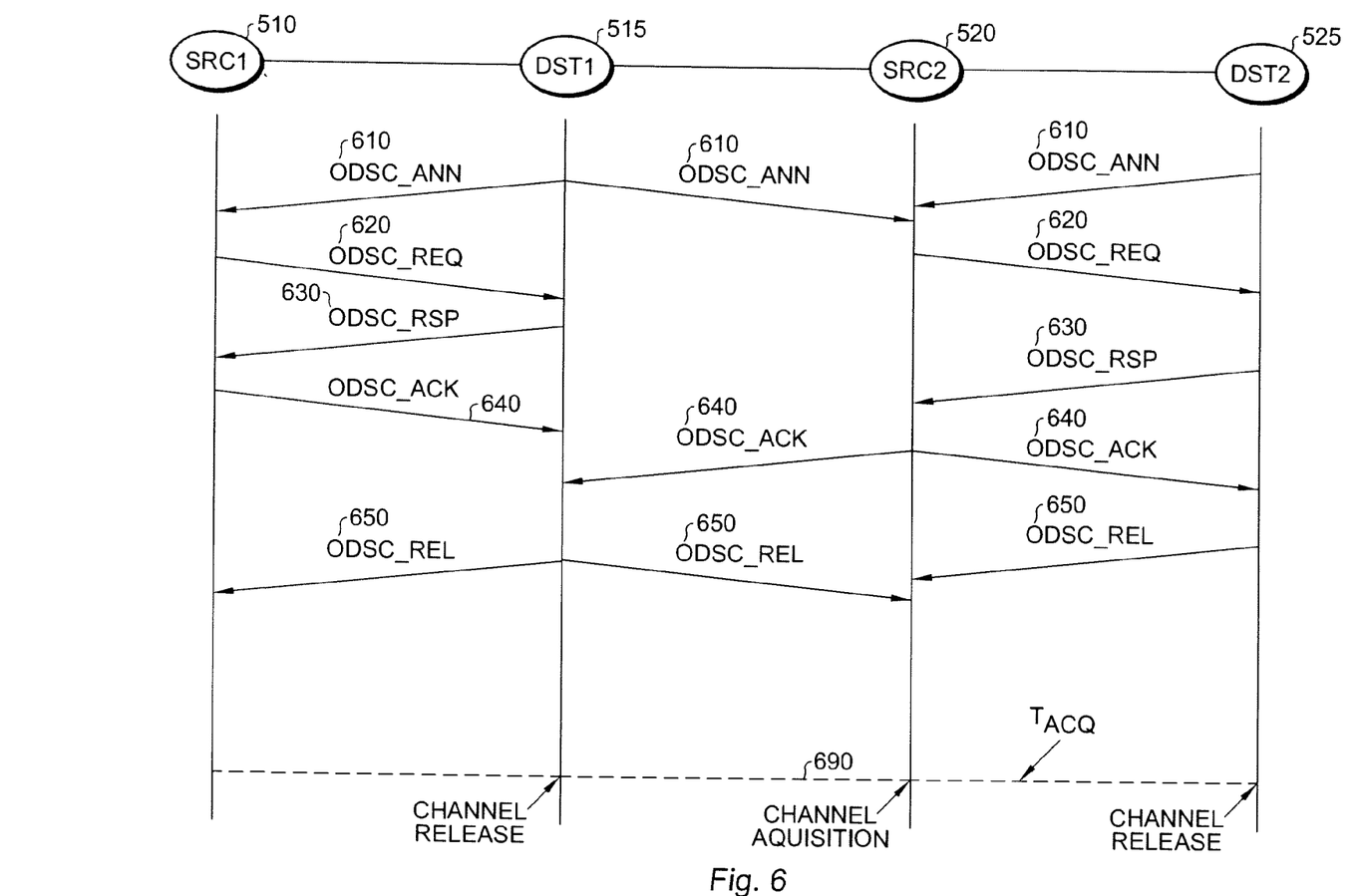

FIGS. 5 and 6 show two basic scenarios, according to embodiments of the present invention, where two sources 510, 520 coexist with two destinations 515, 525 sharing the same spectrum resource. In FIG. 5, two 1-hop sources (SRC1 510 and SRC2 520) simultaneously contend for the same channel with DST1 515 and DST2 525 respectively and can both be granted channel acquisition approximately at the same time as the outcomes of the independent contentions. Note that in this scenario SRC1 510 and SRC2 520 are one-hop neighbors and thus cannot occupy the same shared spectrum at the same time. In order to avoid the collision between SRC1 510 and SRC2 520 in case they both switch to the channel, the time stamp indicating the time at which the contention was resolved is included in the ODSC_ACK message 530, 540, which is broadcasted to all 1-hop neighbors after the channel is granted. In this way, both SRC1 510 and SRC2 520 can capture each other's ODSC_ACK message 530, 540, and only the one (e.g. SRC2) that possesses the earlier time stamp will proceed with the channel acquisition. The source with a bigger time stamp (e.g. SRC1 510) will transmit to the corresponding DST an ODSC_CNL message 550 to cancel the schedule of channel acquisition/release. Meanwhile SRC2 520 schedules the channel release with DST2 525 and receives a corresponding ODSC_REL message 560. Thereafter DST2 525 releases the shared spectrum channel 570 for SRC2's 520 acquisition.

FIG. 6 shows another scenario in which two sources 510, 520 and two destinations 515, 525 may coexist. In this case, SRC1 510 and SRC2 520 may both successfully obtain the right to acquire the channel from DST1 515 and DST2 525 respectively at approximately the same time since SRC1 510 and SRC2 520 are two-hop neighbors. As previously noted the ODSC_ANN 610, ODSC_REQ 620, ODSC_RSP 630 and ODSC_ACK 640 messages transpire as previously discussed. The channel acquisition times selected by SRC1 510 and SRC2 520 in the ODSC_ACK message 640, however, are likely different. This discrepancy in acquisition time can cause collision in channel use, for example, between SRC2 520 and DST1 515, when the channel acquisition time selected by SRC2 520 is earlier than the channel release time of DST1 515 (which is equal to the channel acquisition time selected by SRC1 510). This problem can be overcome by using the ODSC_ACK 640 and ODSC_REL 650 messages that are respectively broadcasted by destinations and sources to coordinate a proper timing for channel switching 690 between the nearby cells.

ODSC is an iterative process driven by two or more types of spectrum-sharing demands. These demands include:

1) Intra-cell demand, which is generated internally by a cognitive radio WAN cell itself as a result of an increasing requirement for spectrum resources. A cognitive radio WAN cell, when triggered by its own intra-cell demand, will initiate the spectrum acquisition procedure.
2) Inter-cell demand, which indicates a spectrum contention request originated from a neighbor cell hunting for available spectrum resources. A cognitive radio WAN cell, being a spectrum resource occupier, upon receipt of an inter-cell demand (a spectrum contention request) will resolve the spectrum contention (determining the winner of the contention) and respond to the contention request.

The reader should note that the spectrum contention decisions based on these spectrum sharing demands are made independently by each coexisting cognitive radio WAN cell. Through analytical and simulation modeling efforts, it can be demonstrated that ODSC, integrating transmission power control and dynamic frequency selection techniques with cooperative spectrum contention, provides satisfied fairness, efficiency, and scalability for dynamic spectrum access operations.

Figure 7:
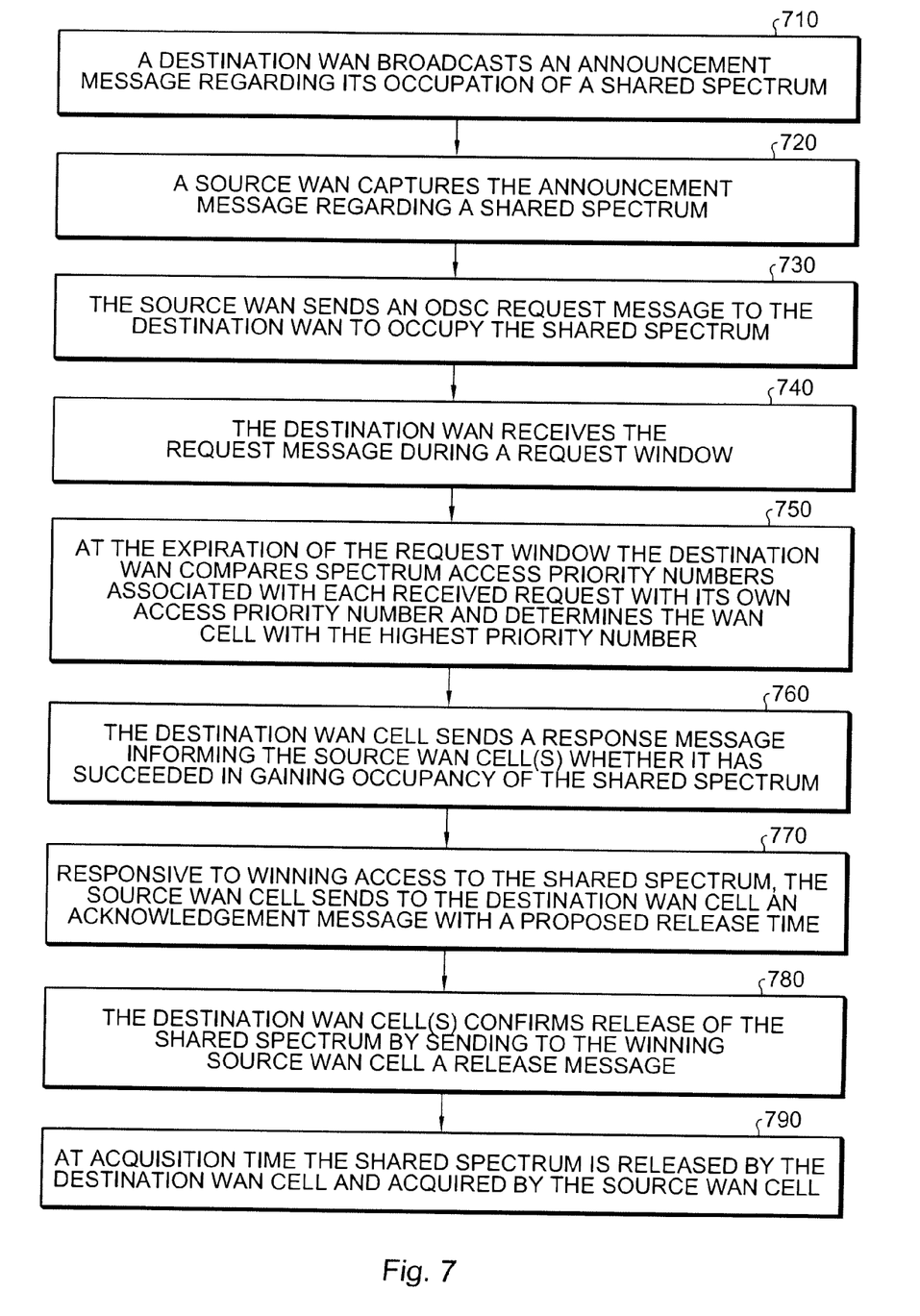
FIG. 7 is a flowchart of one method embodiment for ODSC message flow using MAC layer messaging according to the present invention.

FIG. 7 is a flowchart illustrating methods of implementing an exemplary process for resolving shared spectrum contentions in a cognitive radio WAN using MAC layer messaging. The steps outlined in FIG. 7 along with the message flow depicted in FIGS. 2-6 illustrate a process for efficiently and fairly determining occupancy of shared spectrums in contentious scenarios. In the following description, it will be understood that each block of the flowchart illustration, and combinations of blocks in the flowchart illustration, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustration support combinations of means for performing the specified functions and combinations of steps for performing the specified functions. It will also be understood that each block of the flowchart illustration, and combinations of blocks in the flowchart illustration, can be implemented by special purpose hardware-based computer systems that perform the specified functions or steps, or combinations of special purpose hardware and computer instructions.

ODSC begins with the broadcasting 710 of an announcement message by a destination WAN cell that it currently occupies a shared spectrum. These and other messages of the ODSC occur via the MAC layer using beacons on an independent communications channel. Thus the contention management and shared spectrum contention decision process do not affect the efficiency of the ongoing communication process.

The announcement message is captured 720 by one or more source WAN cells within one-hop of the destination. Due to spectrum demands or other needs as known to one skilled in the relevant art, a source WAN cell responds to the announcement by issuing a request 730 stating its desire to occupy the shared spectrum. Associated with the request is a shared spectrum access priority number. The number is newly generated for each request and each requesting source WAN possesses its own spectrum access priority number.

For the period of a request window, the destination WAN cell receives 740 one or more request messages for access to the shared spectrum. At the expiration of the request window the spectrum access priority number associated with each requesting source WAN cell is compared 750 to the spectrum access priority number of each other requesting source WAN cell. Furthermore, at the end of the request window the destination WAN cell (the WAN cell currently occupying the shared spectrum) generates its own spectrum access priority number. Each number is randomly generated for each request window The comparison of each spectrum access priority number identifies the WAN cell associated with the highest number. This WAN cell, be it a requesting source WAN cell or the current destination WAN cell, is designated as the winner and is to be the next occupier of the shared spectrum.

Subsequent to the comparison of the spectrum access priority numbers and the determination of a winner, the destination WAN cell sends out a response 760 to each requesting source's WAN cell informing it whether it has succeeded in its bid to acquire the shared spectrum or whether its bid has been defeated.

Responsive to the source receiving a response indicating it has won rights to occupy the shared spectrum, the source generates and sends 770 to the destination WAN cell an acknowledgement message confirming that it will acquire the shared spectrum and providing a proposed time of acquisition. In other embodiments in which multiple source cells separated by two-hops may be acquiring access to the same shared spectrum, the acquisition time is coordinated by the destination WAN cell.

The destination WAN cell then confirms the release 780 of the shared spectrum to the winning source WAN cell by sending a release message to the winning WAN cell. The destination WAN cell also informs other cells that were vying for the shared spectrum of their loss, the winner of the comparison and the time of the pending acquisition.

Lastly, at acquisition time, the destination WAN cell releases 790 the shared spectrum as it is acquired by the winning source WAN cell. Shortly thereafter the winning WAN cell, now a destination cell, announces its use of the shared spectrum and initiates its own request window for other sources that wish to occupy the shared spectrum.

The ODSC message flow enables contention decisions to be made by co-existing network cells in a distributed manner and in one that allows an arbitrary number of cells to contend for the same shared spectrum without relying on a central arbiter. Instead cells cooperate with each other to achieve an efficient and fair spectrum sharing scheme.

While there have been described above the principles of the present invention in conjunction with shared spectrum contention resolution, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A method for spectrum sharing among Wireless Regional Area Networks (WRAN) whose service areas overlap, the method comprising:
   providing a separate communication channel for use among base stations (BS), which is separate from WRAN frequency channels;
   synchronizing in time, starts of periodic Contention Windows on the separate communication channel;
   communicating during a Contention Window, on the separate communication channel, between the base stations of the WRANs which wish to reserve time for a temporary sole use of a WRAN frequency channel, messages regarding reserving times for the temporary sole use of the WRAN frequency channel by the base stations;
   determining, from among the base stations requesting the temporary sole use of the WRAN frequency channel, a winner BS and its respective WRAN cell that is to have the temporary sole use of the WRAN frequency channel using random numbers independently and respectively chosen, from a set with a uniform probability distribution, for each base station requesting the temporary sole use of the WRAN frequency channel; and
   assigning and transmitting to the winner BS an acquisition time at which the winner BS can begin temporary sole use of the WRAN frequency channel, and at which other BSs, whose service areas overlap with that of the winner BS, must cease using the WRAN frequency channel,
   wherein the winner BS is determined by choosing the BS with the highest respective random number, which each BS, including an occupier BS, independently generates during each Contention Window before the end of the Request Window, and which each contender BS transmits to the occupier BS in a ODSC_REQ message, and wherein the random numbers are integers in the range of 0 to $2^{32}-1$, inclusive, and are equally probable.

2. A method for spectrum sharing among Wireless Regional Area Networks (WRAN) whose service areas overlap, the method comprising:
   providing a separate communication channel for use among base stations (BS), which is separate from WRAN frequency channels;
   synchronizing in time, starts of periodic Contention Windows on the separate communication channel;
   communicating during a Contention Window, on the separate communication channel, between the base stations of the WRANs which wish to reserve time for a temporary sole use of a WRAN frequency channel, messages regarding reserving times for the temporary sole use of the WRAN frequency channel by the base stations;

determining, from among the base stations requesting the temporary sole use of the WRAN frequency channel, a winner BS and its respective WRAN cell that is to have the temporary sole use of the WRAN frequency channel using random numbers independently and respectively chosen, from a set with a uniform probability distribution, for each base station requesting the temporary sole use of the WRAN frequency channel; and assigning and transmitting to the winner BS an acquisition time at which the winner BS can begin temporary sole use of the WRAN frequency channel, and at which other BSs, whose service areas overlap with that of the winner BS, must cease using the WRAN frequency channel, wherein at the beginning of the Contention Window is an announcement time period during which an occupier BS, which is currently using the WRAN frequency channel transmits a message on a separate communication channel that it is using the WRAN frequency channel, and at a subsequent time period in the Contention Window is an On-Demand Spectrum Contention (ODSC) Request Window, during which contender base stations, which are not using the WRAN frequency channel but wish to use it, transmit, via the separate communication channel, request-to-use messages (ODSC_REQ) to the occupier BS, and wherein at the end of the ODSC Request Window, the occupier BS determines which of the contender BSs is the winner BS, the occupier BS transmits response messages (ODSC_RSP) to the contender BSs, the occupier BS subsequently receives acknowledgement messages (ODSC_ACK) from the contender BSs, and the occupier BS transmits a release time for the winner BS to begin temporary sole use of the WRAN channel, with all transmissions and receptions occurring on the separate communication channel.

3. The method of claim 2, wherein the winner BS is determined by choosing the BS with the highest respective random number, which each BS, including the occupier BS, independently generates during each Contention Window before the end of the Request Window, and which each contender BS transmits to the occupier BS in a ODSC_REQ message.

4. The method of claim 3, wherein the random numbers generated are floating point numbers in the range from 0 and 0.999999, inclusive, and are chosen from a uniform probability density.

5. The method of claim 3, wherein the random numbers generated are integers in the range 0 to $2^{32}-1$, inclusive, and are equally probable.

6. The method of claim 2, wherein a further method is used for reducing transmission interference between WRAN cells with a common overlapping service area, each cell further having a separate overlapping service area with a respective different WRAN cell, in which these different WRAN cells do not themselves overlap, the further method comprising:

including time stamp data in ODSC_ACK messages;

receiving, at the base stations of the cells with the common overlapping service area, the ODSC_ACK message of the other when each has won separate spectrum contentions within the same Contention Window for the same WRAN channel but with the respective different WRAN cells;

deciding that the cell whose ODSC_ACK has the earlier time stamp data will be the cell to acquire temporary sole use of the WRAN channel at the release time.

7. The method of claim 6, wherein the winner BS is determined by choosing the BS with the highest respective random number, which each BS, including the occupier BS, independently generates during each Contention Window before the end of the Request Window, and which each contender BS transmits to the occupier BS in a ODSC_REQ message.

8. The method of claim 7, wherein the random numbers generated are floating point numbers in the range from 0 and 0.999999, inclusive, and are chosen from a uniform probability density.

9. The method of claim 7, wherein the random numbers generated are integers in the range 0 to $2^{32}-1$, inclusive, and are equally probable.

* * * * *